J. DANNER.
SHELF, COAT RACK, AND CLOTHES FRAME.

No. 89,031. Patented Apr. 20, 1869.

Witnesses:
E. M. K. Bowen
Edmund Masson

Inventor:
John Danner
By atty A. B. Stoughton

JOHN DANNER, OF CANTON, OHIO.

Letters Patent No. 89,031, dated April 20, 1869.

IMPROVED SHELF, COAT-RACK, AND CLOTHES-FRAME.

The Schedule referred to in these Letters Patent and making part of the same.

*To all whom it may concern:*

Be it known that I, JOHN DANNER, of Canton, in the county of Stark, and State of Ohio, have invented certain new and useful Improvements in a Combined Coat-Rack and Clothes-Frame; and I do hereby declare the following to be a full, clear, and exact description of the same, reference being had to the accompanying drawings, making a part of this specification, in which—

Figure 1:
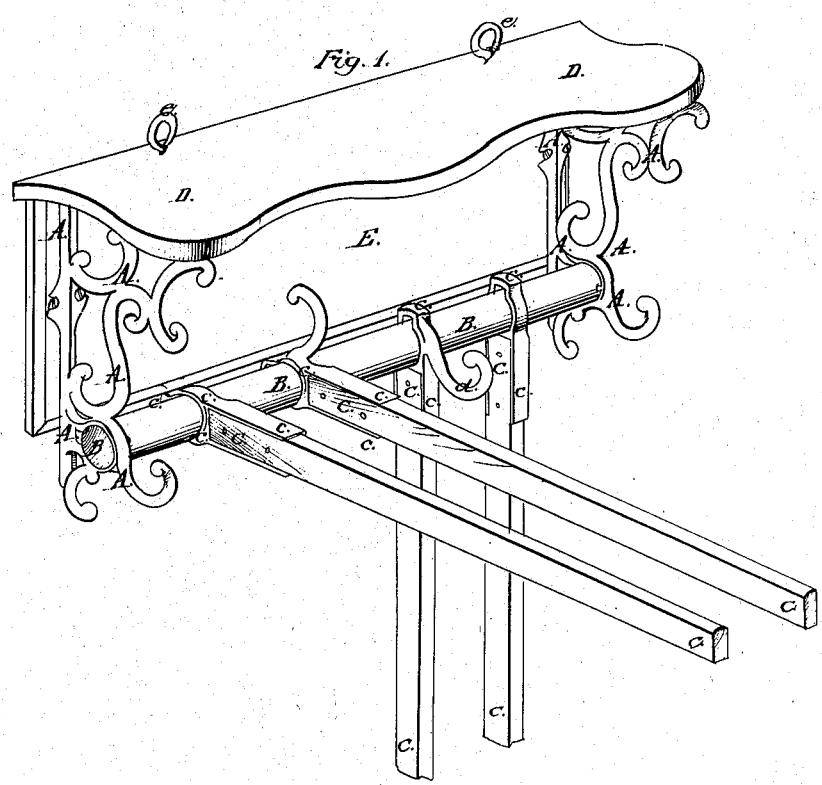
Figure 1 represents, in perspective, the combined coat-rack and clothes-frame, as connected with or applied to a shelf, brackets, and hooks, by which it may be hung up and made portable, though they may be a fixture.
Figure 2:
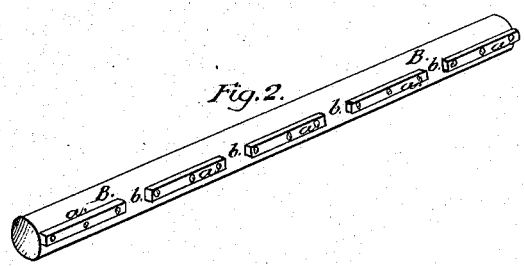
Figure 2 represents a perspective of the bar on which the hooks and arms can be held up or let down, said bar being represented as detached from its supports, and turned around, so as to show the tongues, or projections on its rear, and not clearly seen in fig. 1.

My invention consists, first, in a combined coat-rack and clothes-frame, composed substantially of arms, hung by suitable metallic end-pieces, which end-pieces have on or connected to them, hooks, upon which coats or hats may be hung when in one position, and which, when swung in another position, form arms extending out horizontal, or nearly so, and capable of holding clothes, the positions of the hooks and of the arms being attainable by the grooves in the end-pieces, the tongues on the sustaining-bar, and the spaces intervening between the tongues; and My invention further consists, in supporting a combined clothes-frame and coat-rack in brackets or supports, which also sustain a shelf, or so that the shelf shall overhang the coat-rack hooks, and thus make the whole article useful and ornamental, as well as to make the shelf a protection to the coats and other articles hung thereto, against dust, &c.

To enable others skilled in the art to make and use my invention, I will proceed to describe the same with reference to the drawings.

A A represent a pair of brackets, or supports, in which is firmly fixed, so as not to roll or turn, a bar, B, of wood, or of metal, or of parts of each.

Upon this bar there is arranged in line a series of ribs, tongues, or projections, *a a a*, with a series of spaces, *b b b*, intervening between them, or the bar B may be square or angular, and without ribs.

C C C are a series of arms, which may be of wood, upon the end of each of which there is a cast end-piece, *c*, with an opening through it that will allow it to slip endwise upon the bar B, said opening being elongated also, so as to take in and slip on the ribs *a a*, &c.

Upon the end-pieces *c*, or any suitable number of them, there is cast a hook, *d*, of the form in common use for hanging coats or hats upon.

When the pieces *c* are slipped on to the ribs *a*, they and their arms will be held up and out in a horizontal position, or nearly so. When they are moved to the spaces *b* that intervene between the ribs, then the end-pieces and the arms attached to them can swing or turn on the bar, and drop into a perpendicular position, in which last position the hooks *d* will be ready to receive and hold a coat, hat, or other article; or, in other words, when the arms are horizontal the article is a clothes-frame; when the arms are perpendicular it is a coat-rack.

Upon the brackets A there is also arranged and supported a shelf, D, and the whole may be hung up in place by nails or cords, passing through the hooks or dead-eyes *e*, fastened to or in the wood-work of the shelf.

There may also be a wall, or perpendicular board E, under the shelf, to which the shelf, as well as the brackets, may be attached.

I have represented the coat-rack and clothes-frame as being straight only. They may be circular or angular, so as to be used in any position most desirable for their location, and may be portable, or a fixture, whichever is preferred.

Having thus fully described my invention,

What I claim therein as new, and desire to secure by Letters Patent, is—

The arms C, and their metallic end-pieces *c*, with the bar B, made square or with ribs *a* and spaces *b*, in combination with a shelf, and with brackets for sustaining them, substantially as herein described and represented.

JOHN DANNER.

Witnesses:
GEO. W. RAFF,
ISAAC HAWK.